US012168892B2

(12) United States Patent
Ubell et al.

(10) Patent No.: US 12,168,892 B2
(45) Date of Patent: Dec. 17, 2024

(54) PRESSURE SENSITIVE FLEXIBLE BUTTON LOCK AND RETRACTABLE PACKAGE THEREOF

(71) Applicant: Sunshine Enclosures LLC, New York, NY (US)

(72) Inventors: Edward Ubell, New York, NY (US); Harry Kubetz, New York, NY (US)

(73) Assignee: Sunshine Enclosures LLC, New York, NY (US)

( * ) Notice: Subject to any disclaimer, the term of this patent is extended or adjusted under 35 U.S.C. 154(b) by 281 days.

(21) Appl. No.: 17/700,416

(22) Filed: Mar. 21, 2022

(65) Prior Publication Data

US 2023/0295961 A1 Sep. 21, 2023

(51) Int. Cl.
*E05B 65/46* (2017.01)
*E05B 15/04* (2006.01)

(52) U.S. Cl.
CPC .............. *E05B 65/46* (2013.01); *E05B 15/04* (2013.01); *E05B 2015/0437* (2013.01); *E05B 2015/0468* (2013.01)

(58) Field of Classification Search
CPC ...... E05B 65/46; E05B 65/0014; E05B 15/04; E05B 2015/0437; E05B 2015/0468; E05C 19/06; Y10T 403/32483; Y10T 403/32524; Y10T 70/5836; Y10T 70/5872; Y10T 70/70437; Y10T 70/585; Y10T 70/5881; Y10T 70/5885; Y10T 70/7062
USPC ........................................................... 70/277
See application file for complete search history.

(56) References Cited

U.S. PATENT DOCUMENTS

| | | | | |
|---|---|---|---|---|
| 5,147,099 A * | 9/1992 | McLinden | .......... | E05B 65/0014 292/DIG. 65 |
| 5,647,618 A * | 7/1997 | Lamberth | .......... | E05B 65/0014 292/19 |
| 7,610,783 B2 * | 11/2009 | Rudduck | .......... | B62J 50/225 70/277 |
| 2006/0002759 A1 * | 1/2006 | Blackman | .......... | F16B 7/18 403/109.3 |

* cited by examiner

*Primary Examiner* — Michael P Ferguson
*Assistant Examiner* — Thomas L Neubauer
(74) *Attorney, Agent, or Firm* — Bochner PLLC; Andrew Bochner; Eric Kleinertz

(57) ABSTRACT

The invention of the present disclosure may be a pressure sensitive locking mechanism comprising a body comprising a flex portion and an anchor portion. The locking mechanism may further comprise a tab disposed on a guard, where the tab may be orthogonal to the guard. In an embodiment, locking mechanism is configurable in a locked state and an unlocked state, where the tab may be configured to receive a pressure, where application of the pressure may be configured to convert the lock from the locked state to the unlocked state, and withdrawal of the pressure may be configured to convert the lock from the unlocked state to the locked state. The locking mechanism may be integrated with a slidable container, enabling reversible locking.

10 Claims, 4 Drawing Sheets

PRESSURE SENSITIVE FLEXIBLE BUTTON LOCK AND RETRACTABLE PACKAGE THEREOF

FIELD OF INVENTION

The present invention is in the field of reversibly lockable devices. Specifically, pressure-selective button locking mechanisms and the sliding packages thereof.

INTRODUCTION

People around the world have been storing their belongings in containers for centuries. Today, there are a number of containers available to people. These containers are made of various materials, in differing shapes and sizes. However, many such containers may be inadequate for various reasons. Specifically, many individuals may seek to store belongings that should not be readily available to minors. Thus, containers having easily removed lids or effortlessly opened drawers may be insufficient.

Many such containers may be equipped with an external lock, for example, a combination or key lock. Even further, other containers may not include mounting points for such locks. Such locks may be cumbersome and may decrease usable storage space. One may attempt to integrate traditional locking mechanisms into the internals of a container. However, traditional locking mechanisms may restrict storage space and may not be easily fitted to preexisting containers. For example, such containers may include dimensions or geometric features that are not conducive for retrofitted internal locking mechanisms.

Accordingly, it would be desirable to provide locking mechanisms that may be easily fitted within a wide range of containers. It would be further desirable to provide a container utilizing locking mechanisms that are unobtrusive, yet secure the container from entry by children.

SUMMARY

The invention of the present disclosure may be a pressure sensitive locking mechanism comprising a flex portion comprising a first flex segment, a first flex bend, a second flex segment, a second flex bend, a third flex segment, a third flex bend, a fourth flex segment, a fourth flex bend, and a fifth flex segment, where the first flex segment, the third flex segment, and the fifth flex segment are parallel, where the second flex segment and the fourth flex segment are parallel, and where the first flex segment, the first flex bend, the second flex segment, the second flex bend, the third flex segment, and the third flex bend form an elbow. The pressure sensitive locking mechanism may further comprise an anchor portion comprising a first anchor bend, a first anchor segment, a second anchor bend, a second anchor segment, and an anchor end, where the first anchor segment is orthogonal to the second anchor segment. In a further embodiment, the pressure sensitive locking mechanism includes a guard disposed orthogonally to the first flex segment, and a tab disposed on the guard, the tab further disposed orthogonal to the guard. The pressure sensitive locking mechanism may be configurable in a locked state and an unlocked state, where the tab and the elbow may be configured to receive a pressure via the tab, where application of the pressure may be configured to convert the pressure sensitive locking mechanism from the locked state to the unlocked state, and where withdrawal of the pressure may be configured to convert the pressure sensitive locking mechanism from the unlocked state to the locked state.

In an embodiment, the tab further comprises a first tab edge and a second tab edge, where the first tab edge and the second tab edge are orthogonal to the guard, and a tab rim comprising a convex curvature relative to the guard, where a first tab corner conjoins the tab rim and the first tab edge, and a second tab corner conjoins the tab rim and the second tab edge, where the first tab corner and the second tab corner are rounded. The pressure sensitive locking mechanism may further comprise a first rim extending from the guard to the anchor end; a second rim extending from the guard to the anchor end; a central plane disposed between the first rim and the second rim; a top duct bound by at least the first rim, the central plane, and the second rim; and a bottom duct bound by at least the first rim, the central plane, and the second rim, where the top duct is antipodal to the bottom duct.

A pressure sensitive locking container may comprise a pressure sensitive locking mechanism (for example, any embodiment of a pressure sensitive locking mechanism described herein) and a tray comprising a bottom surface, a floor, a spacer, a first sidewall, a second sidewall, a front wall, a rear wall, a lock channel, and an aperture, where the bottom surface traverses the first sidewall, the second sidewall, the front wall, and the rear wall, where the spacer is disposed atop the bottom surface and the floor is disposed atop the spacer, where the lock channel is bound by at least the bottom surface, the spacer, and the floor, and the lock channel is sized to accept at least the flex portion and the anchor portion, where the tray is configurable in a sheathed state and an unsheathed state, and where the aperture is sized to accept the tab. The pressure sensitive locking container may further comprise a sleeve sized to accept the tray in the sheathed state, the sleeve comprising a sleeve window, where the sleeve window is sized to accept the tab, where, in the sheathed state, the sleeve window is overlaid the aperture, and where the tray may be configured to convert from the sheathed state to the unsheathed state via removal of the sleeve in the unlocked stated. In an embodiment, the flex portion may comprise a flex width and the anchor portion may comprise an anchor width, where the anchor width is greater than the flex width.

The invention of the present disclosure may be a pressure sensitive locking container comprising two pressure sensitive locking mechanisms (for example, any embodiment of a pressure sensitive locking mechanism described herein) and a tray comprising a bottom surface, a floor, a spacer, a first sidewall, a second sidewall, a front wall, a rear wall, a first lock channel, a second lock channel, a first aperture, and a second aperture, where the bottom surface traverses the first sidewall, the second sidewall, the front wall, and the rear wall, where the spacer is disposed atop the bottom surface and the floor is disposed atop the spacer, where the lock channels are bound by at least the bottom surface, the spacer, and the floor, and the lock channel is sized to accept at least the flex portion and the anchor portion, where the tray is configurable in a sheathed state and an unsheathed state, and where the first aperture and the second aperture are sized to accept the tabs. In an embodiment, the pressure sensitive locking container further includes a sleeve sized to accept the tray in the sheathed position, the sleeve comprising a first sleeve window and a second sleeve window, where the first sleeve window and the second sleeve window are each sized to accept one of the tabs, where, in the sheathed state, the first sleeve window is overlaid the first aperture and the second sleeve window is overlaid the second aperture, and where the tray is configured to convert from the sheathed state to the unsheathed state via removal of the sleeve in the unlocked stated.

Additional aspects related to this disclosure are set forth, in part, in the description which follows, and, in part, will be obvious from the description, or may be learned by practice of this disclosure.

It is to be understood that both the forgoing and the following descriptions are exemplary and explanatory only and are not intended to limit the claimed disclosure or application thereof in any manner whatsoever.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

Figure 1:
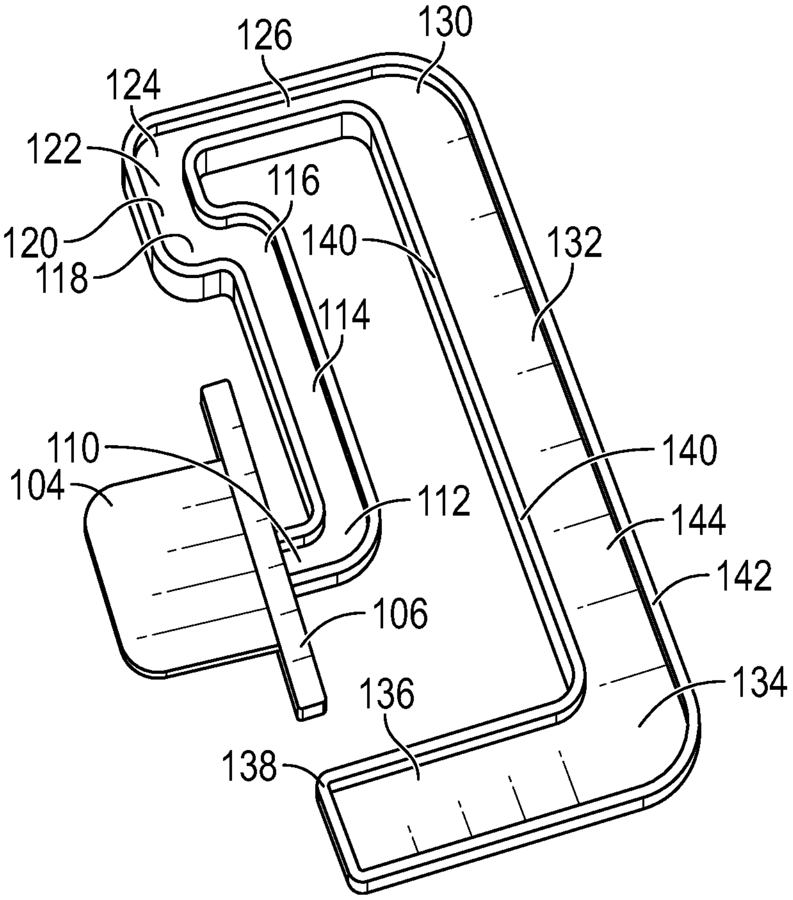
FIG. 1 is a perspective view of an embodiment of a lock.

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

The invention of the present disclosure may be a lock 100, for example, a pressure sensitive locking mechanism. The lock 100 may include a body 102, a tab 104, and a guard 106. The guard 106 may be configured to prevent the tab 104 from extending too far outside the aperture. For example, there may be a consistent outward force within the lock 100 pushing the tab 104 outward and the guard 106 may be adapted to prevent such force from over extending the tab 104. The body 102 may encompass the various segments and bends that make up the portion of the lock 100 that is not directly interacted with by the user. The tab 104 may be a member configured to accept pressure from a user. For example, the tab 104 may be "pressed" by the user. In an embodiment, the tab 104 may be a planar member, generally positioned in the same plane as the body 102. The tab 104 and the body 102 may be separated by a guard 106. The guard 106 may be a planar member orthogonal to the body 102 and/or the tab 104. The guard 106 may be a flat component having rounded corners. However, the guard 106 may be any suitable shape or dimensions.

The body 102 may be composed of two families of components: the flex portion 108; and the anchor portion 128. The flex portion 108 may be disposed proximally to the guard 106 and the tab 104. The flex portion 108 may be configured to "flex" or otherwise move as a function of the pressure applied to the tab 104. However, in various embodiments, each component of the flex portion 108 may flex according to varying degrees. For example, the components disposed closer to the tab 104 may be displaced more than the components disposed further from the tab 104, when pressure is applied to the tab 104. Thus, in some embodiments, some components of the flex portion 108 may not move or may have negligible movement.

In an embodiment, the flex portion 108 comprises a first flex segment 110, a first flex bend 112, a second flex segment 114, a second flex bend 116, a third flex segment 118, a third flex bend 120, a fourth flex segment 122, and a fourth flex bend 124. In a further embodiment, the flex portion 108 may also include a fifth flex segment 126. The first flex segment 110 may be in contact with the guard 106 and the first flex bend 112. In such an embodiment, the first flex segment 110 may be orthogonal to the guard 106. The first flex bend 112 may be disposed at a ninety degree angle, such that the second flex segment 114 is parallel to the guard 106, yet orthogonal to the first flex segment 110. The second flex segment 114 may be in contact with the first flex bend 112 and the second flex bend 116. The second flex bend 116 may be disposed at a ninety degree angle, such that the third flex segment 118 is parallel to the first flex segment 110. In such an embodiment, the third flex segment 118 may be disposed between the second flex bend 116 and the third flex bend 120. The third flex bend 120 may be disposed at a ninety degree angle, such that the fourth flex segment 122 is parallel to the guard 106 and the second flex segment 114. However, in such an embodiment, the fourth flex segment 122 may be perpendicular to the third flex segment 118 and the first flex segment 110. The fourth flex segment 122 may be disposed between the third flex bend 120 and the fourth flex bend 124. The fourth flex bend 124 may be disposed at a ninety degree angle, such that the fifth flex segment 126 is parallel to the first flex segment 110 and the third flex segment 118.

In an embodiment, the anchor portion 128 comprises a first anchor bend 130, a first anchor segment 132, a second anchor bend 134, a second anchor segment 136, and an anchor end 138. The first anchor bend 130 may be disposed at a ninety degree angle, such that the first anchor segment 132 is parallel to the second flex segment 114 and the fourth flex segment 122. The first anchor segment 132 may be disposed between the first anchor bend 130 and the second anchor bend 134. The second anchor bend 134 may be disposed at a ninety degree angle, such that the second anchor segment 136 is parallel to the fifth flex segment 126. The second anchor segment 136 may be disposed between the second anchor bend 134 and the anchor end 138. The anchor end 138 may be an edge of the anchor portion 128 disposed proximally to the guard 106. In such an embodiment, although the anchor end 138 may be disposed in close proximity to the guard 106, the anchor end 138 may not be in contact with the guard 106. Each of the bends may be curved such that the flexing of the lock 100 is more evenly distributed. For example, the curvature of the bends may allow for easier movement under compression. In an alternate embodiment, the bends may include square corners or any suitable curvature, geometry, or angle.

Further, the body 102 may comprise a first rim 140 and a second rim 142. The first rim 140 and the second rim 142 may be the edges of the body 102 which each extend from the guard 106 to the anchor end 138. In an embodiment, the flex portion 108 may have a flex width, generally measured between the first rim 140 and the second rim 142 throughout the flex portion 108. Similarly, the anchor portion 128 may have an anchor width, generally measured between the first rim 140 and the second rim 142 throughout the anchor portion 128. For example, the flex width and the anchor width may be measured as the shortest distance between the first rim 140 and the second rim 142 at any given section of the body 102, such as a cross-section of the body 102. As shown in FIG. 2, the anchor width may be greater than the flex width. Accordingly, the anchor portion 128, having a greater width, may be more rigid and inherently more stable than the flex portion 108. In effect, the flex portion 108, having a lesser width, may be less rigid and inherently more flexible. Thus, the varying widths of the flex portion 108 and the anchor portion 128 may be configured to enable sufficient flexibility in the flex portion 108 components and sufficient rigidity in the anchor portion 128 components. Further, the various widths of the flex portion 108 and the anchor portion 128 may be configured to reduce material requirements during the manufacturing process. For example, the flex portion 108, having a reduced width, may require less material, allowing the lock 100 to be manufactured at a lower cost and more efficiently with fewer materials.

Figure 5:
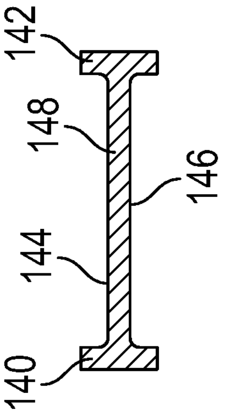
FIG. 5 is a cross-sectional view of an embodiment of a lock, for example, along a first anchor segment.

The body 102 may comprise a top duct 144 and/or a bottom duct 146. The central plane 148 may be disposed between the top duct 144 and the bottom duct 146. Accordingly, the top duct 144 may be partially bound by the first rim 140, the central plane 148, and the second rim 142; and, similarly, the bottom duct 146 may be partially bound by the first rim 140, the central plane 148, and the second rim 142. However, the top duct 144 may be disposed opposite or antipodal of the bottom duct 146. The top duct 144, the bottom duct 146, the first rim 140, the second rim 142, and the central plane 148 may extend from the guard 106 to the anchor end 138. By incorporating the top duct 144 and the bottom duct 146 into the lock 100, the body 102 may have a decreased weight, yet a favorable area to be accepted by a box or container (described in further detail hereafter). Thus, the inclusion of the ducts 144/146 may permit the lock 100 to exhibit the necessary flexibility for actuation of the tab 104, pliability for movement of the flex portion 108, rigidity for steadfastness of the anchor portion 128, and pliability of the lock 100 to reversibly convert between the locked and unlocked states. Inclusion of the rims and ducts may aid the lock 100 in bending perpendicular to the applied force. For example, by including a thin central plane 148 and rims 140/142, as shown in FIG. 5, the lock 100 may exhibit both a rigidity and flexibility enabling actuation of the tab 104 with an appropriate force. In such an example, the appropriate force may be that of an adult's thumb or forefinger strength. Moreover, the appropriate force and dexterity required to convert the lock 100 from the locked to unlocked state may be configured beyond the capabilities of a child. Further, the inclusion of the rims and ducts, as shown in FIG. 5, enable manufacture of a flexible yet rigid lock 100 having a reduced quantity of material. Thus, the arrangement of ducts and rims may further save costs and time during the manufacturing process.

The tab 104 may include a tab rim 150, a first tab edge 152, a second tab edge 154, a first tab corner 156, and/or a second tab corner 158. The tab rim 150 may be generally rounded such that the apex of the curvature occurs at the midpoint between the first tab corner 156 and the second tab corner 158. Thus, the tab rim 150 may be formed of a curvature, for example, a convex curvature relative to the guard 106. In such an embodiment, the tab rim 150 may include a curve protruding away from the guard 106. However, the tab rim 150 may be flat. In various embodiments, the tab rim 150 may include any suitable curvature. The tab rim 150 may include curvature configured to enable actuation of the lock 100 by a user. Further, the first tab corner 156 and/or the second tab corner 158 may be rounded. Accordingly, the tab rim 150, the first tab corner 156, and/or the second tab corner 158 may be sized to accommodate smooth movement into a box (for example, an aperture and/or sleeve window) upon retraction of a box sleeve (described in further detail below). In short, the rounded and curved nature of the tab rim 150, the first tab corner 156, and the second tab corner 158 may prevent the tab 104 from becoming caught on the sleeve window upon retraction of the sleeve. For example, if the tab 104 is particularly jagged or sharp, even upon actuation of the tab 104, the tab rim 150 may negatively interface with the sleeve window, causing the tab, sleeve, and tray to bind.

The tab 104 may further comprise a first tab edge 152 and a second tab edge 154. The first tab edge 152 may extend from the guard 106 to the first tab corner 156. Similarly, the second tab edge 154 may extend from the guard 106 to the second tab corner 158. Thus, the tab 104 may be bound by and/or formed by the first tab edge 152, the first tab corner 156, the tab rim 150, the second tab corner 158, the second tab edge 154, and the guard 106.

In an embodiment, the tab 104 may be disposed orthogonal to the guard 106 and central to guard 106. Further, the first flex segment 110 may be disposed orthogonal to the guard 106 and central to the guard 106. For example, the tab 104 and/or the first flex segment 110 may contact the guard 106 at the guard's center of mass. The plane of the tab 104 may be parallel to the central plane 148.

The first flex segment 110, the first flex bend 112, the second flex segment 114, the second flex bend 116, the third flex segment 118, and/or the third flex bend 120 may be referred to herein as the "elbow." The elbow and the components thereof may be sized and configured such that the outermost surface of the guard 106, the outermost surface of the anchor end 138, and/or the outermost surface of the fourth flex segment 122 are aligned, as shown in FIG. 2. The elbow may be recessed to the center of the lock 100. Further, the elbow may be sized and configured such that the tab 104 is positioned closer to the anchor end 138 than to the fourth flex bend 124. Accordingly, the elbow may generally flex inward upon receiving pressure to the tab 104. However, an adequate distance may exist between the first anchor segment 132 and the second flex segment 114 to enable the elbow and/or the tab 104 to sufficiently move inward to unlock the lock 100. Thus, the fifth flex segment 126 may be of an adequate length to provide sufficient clearance between the elbow and the first anchor segment 132.

Figure 2A:
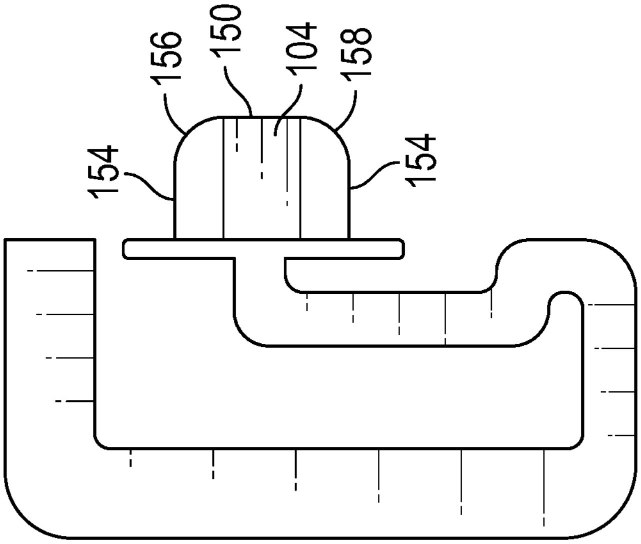
FIGS. 2A-2B are views of a lock in the locked state and unlocked state, respectively.
Figure 2B:
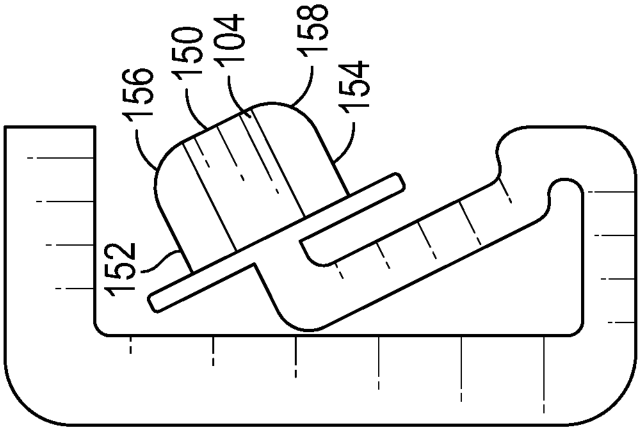
Figure 3:
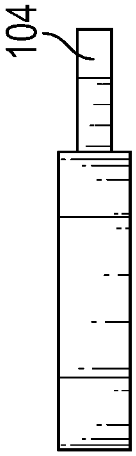
FIG. 3 is a side view of an embodiment of a lock.
Figure 4:
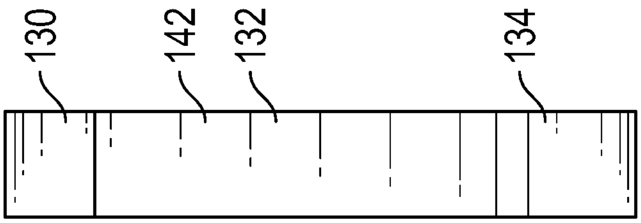
FIG. 4 is a rear view of an embodiment of a lock.

The lock 100 and/or, specifically, the elbow may be configurable in a locked state and an unlocked state. In a locked state, as shown in FIG. 2A, the tab 104 may be protruding from the lock and the second flex segment 114 may be parallel to the first anchor segment 132. In such a locked state, the tab 104 may be receiving minimal or no pressure from a user. In an unlocked state, as shown in FIG. 2B, the tab 104 may be disposed at least partially central to the lock 100. For example, the elbow and/or the flex portion 108 may include a pliability or flexibility, wherein a pressure may be applied to extend the tab 104 behind the outermost surface of the anchor end 138. In such an example, the rigidity of the elbow and/or the flex portion 108 may be overcome via application of reasonable pressure to the tab 104. Further, the elbow and/or the flex portion 108 may include a plasticity, wherein the lock 100 returns to the locked state after discontinuing the pressure.

The invention of the present disclosure may include a tray 200. The tray 200 may comprise a bottom surface 204, one or more sidewalls 206 (for example, a first sidewall and a second sidewall), a front wall 208, and/or a rear wall 210. In an embodiment, one or more apertures 202 may be disposed on any of the one or more sidewalls 206, the front wall 208, and/or the rear wall 210. As a non-limiting example, an aperture 202 may be disposed on both of the two sidewalls 206. However, in another embodiment, the tray 200 may include a single aperture 202.

Figure 6:
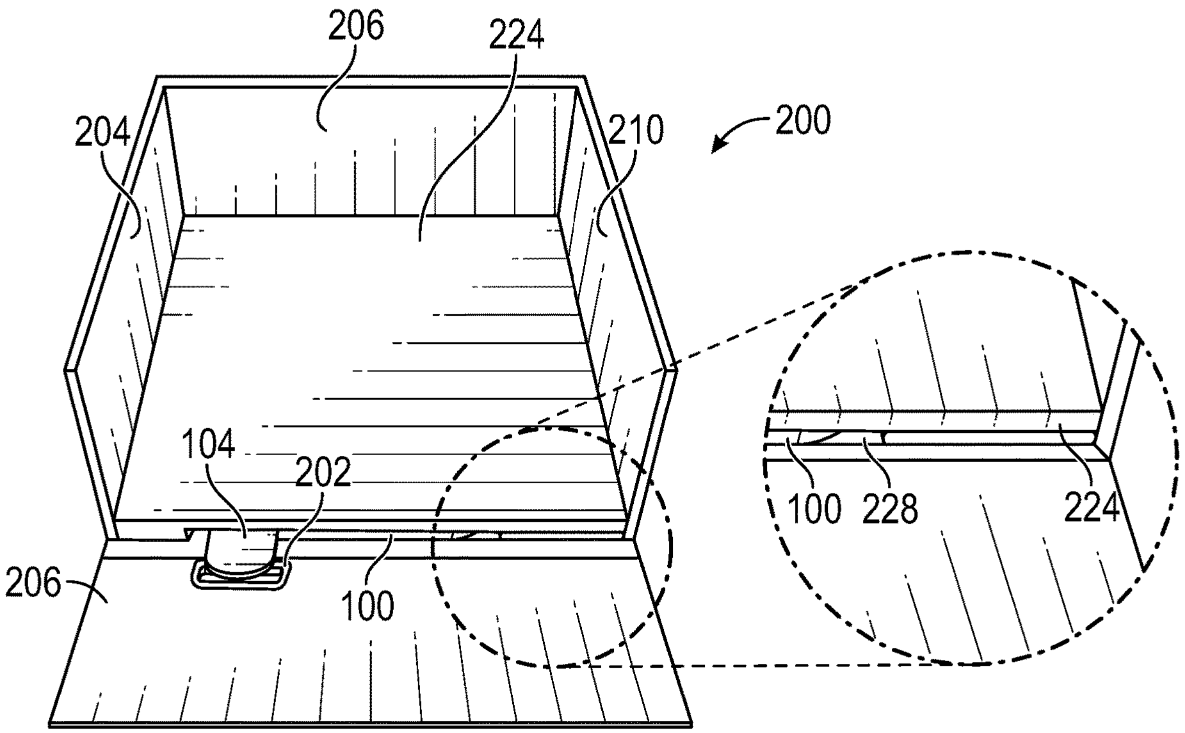
FIGS. 6-7 illustrate embodiments of a tray.

Referring to FIG. 6, the tray 200 may comprise a bottom surface 204, a floor 224, a spacer 226, and a lock channel 228. The bottom surface 204 may be a planar member disposed between the bottom portions of the sidewalls 206, front wall 208, and the rear wall 210. A spacer 226 may be disposed atop the bottom surface 204. Further, a floor 224 may be disposed atop the spacer 226. The spacer 226 and the floor 224 may also be flat planar members. The spacer 226 may include a cutout such that a lock channel 228 is formed between the bottom surface 204, the floor 224, and the spacer 226. Accordingly, the lock channel 228 may be sized to accept the lock 100. Thus, the height of the spacer 226 may correlate to the height of the first rim 140 and/or the second rim 142. The lock channel 228 and/or spacer 226 may be sized such that the first anchor segment 132 contacts the spacer 226. In such an embodiment, the spacer 226 also acts as a backstop for the lock 100. Thus, a user may apply pressure to the tab 104, causing the tab 104, elbow, and/or flex portion 108 to more deeply enter the lock channel 228, wherein the spacer 226 prevents movement of the first anchor segment 132. To prevent horizontal movement of the lock 100, the lock channel 228 may be sized such that the fifth flex segment 126, the first anchor segment 132, and the second anchor segment 136 each contact the spacer 226. In such an embodiment, the fifth flex segment 126, the first anchor segment 132, and the second anchor segment 136 may contact the spacer 226 via the second rim 142.

The tray 200 may include more than one apertures 202. For example, a first aperture may be disposed on a first sidewall and a second aperture may be disposed on a second sidewall. The aperture 202 may be disposed a distance from the bottom surface 204 such that the tab 104 extends through the aperture 202 when the lock 100 is disposed within the lock channel 228.

In an embodiment where the tray 200 includes more than one apertures 202, the spacer 226 may include more than one cutouts, such that more than one lock channels 228 are formed by the bottom surface 204, the spacer 226, and the floor 224. In an embodiment, the locks 100 may be disposed in any orientation sufficient to enable actuation of the locks 100 and removal of the sleeve 214. For example, the two locks 100 may be disposed along opposite sidewalls 206, wherein the fifth flex segment 126 of each of the two locks 100 are in closer proximity to that front wall 208 than the second anchor segment 136 is to the front wall 208. In such a non-limiting example, the two locks 100 may have chirality such that the two locks 100 are mirrored. In an alternate non-limiting example, the second lock 100 may be flipped along both a first axis and a second axis, relative to the first lock 100.

Figure 8A:
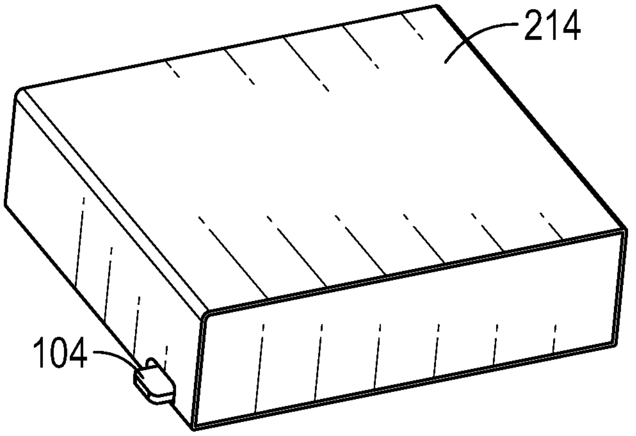
FIGS. 8A-8B are illustrations of a tray and a sleeve in a sheathed state and unsheathed state, respectively.
Figure 8B:
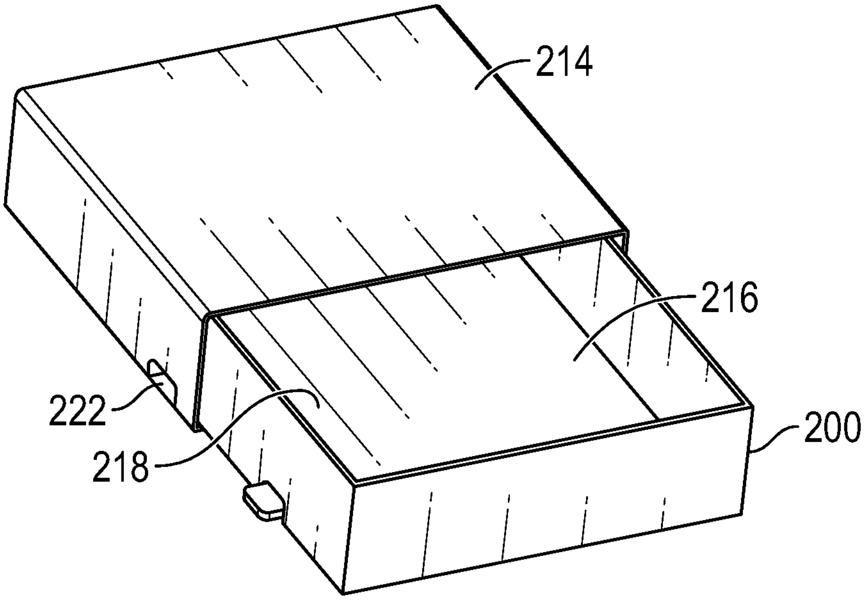

Referring to FIGS. 8A-8B, a sleeve 214 may be reversibly disposed over the tray 200. The sleeve 214 may be a rectangular member having a cavity 216 sized to accept the tray 200. The sleeve 214 may include a front sleeve opening 218 and/or a rear sleeve opening 220. Further, the sleeve 214 may include one or more sleeve windows 222, where the sleeve windows 222 may be positioned over the aperture 202 when the sleeve 214 is in a sheathed state. In a sheathed state, the sleeve 214 may surround the tray 200. In an unsheathed state, the sleeve 214 may be removed from the tray 200. Accordingly, in a sheathed state, one or more tabs 104 may extend through the one or more apertures 202 and sleeve windows 222.

In an embodiment, the tray 200 may be converted from a sheathed state to an unsheathed state by compressing the one or more tabs 104 and withdrawing the sleeve 214 from the tray 200. In such an embodiment, a user may compress the tab 104 a distance where the tab rim 150 clears the sleeve window 222. In effect, the tab 104 extending through the sleeve window 222 may act to lock the sleeve to the tray 200. Thus, by removing the tab 104 obstruction from the sleeve window 222 the tray 200 and sleeve 214 may be 'unlocked.'

Figure 7:
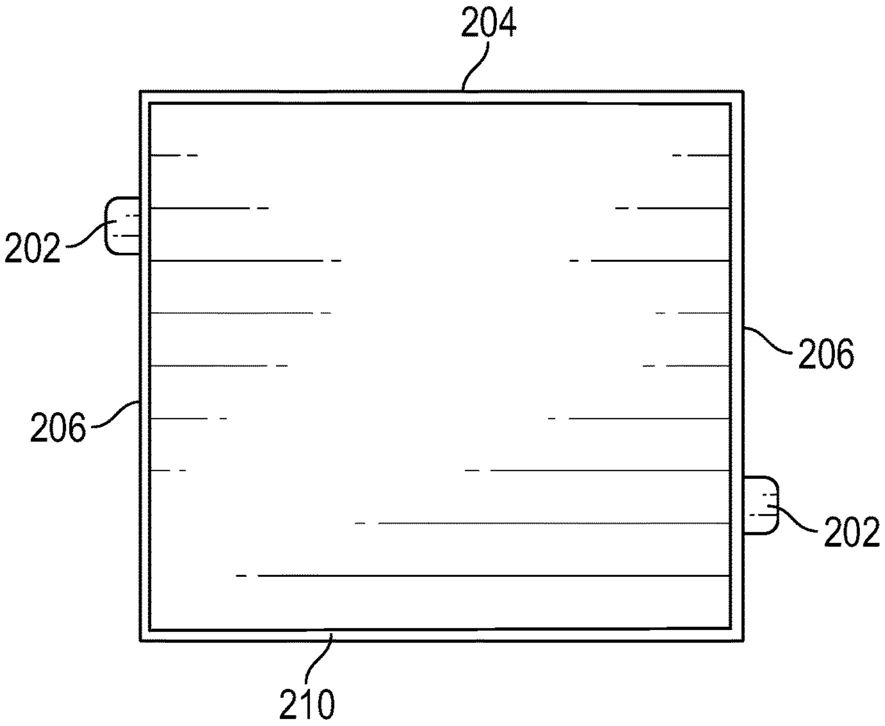

The tray 200 may include two apertures 202 and two locks 100; and the sleeve 214 may include two sleeve windows 222. In such an embodiment, each of the two locks 100 may be disposed on opposite sidewalls. Further, each of the two locks 100 may be disposed on opposite ends of the tray 200 (for example, a first lock 100 may be disposed on a sidewall portion proximally to the rear wall 210 and a second lock 100 may be disposed on a sidewall portion proximally to the front wall 208, as shown in FIG. 7). As a non-limiting example, a tray 200 having two locks 100 may require a user to utilize two hands and/or two fingers to depress both tabs 104 and remove the sleeve 214. In such an example, the tray 200 and sleeve 214 may be "child proof," "child resistant," or "tamper proof." However, such an embodiment may enable compression of both tabs 104 by compression with one hand, for example, by grasping the underside of the tray 200 and compressing a first tab with one's thumb and a second tab with one's ring finger.

In an embodiment, the lock 100 may be composed of a plastic. For example, the plastic may have a flexibility, rigidity, and plasticity sufficient to enable conversion between a locked and unlocked state. However, the lock 100 may be composed of any suitable material. The material of the lock 100, tray 200, and/or sleeve 214 may be environmentally friendly. For example, the use of plastics may be minimized. However, in one embodiment, the lock 100 may be composed of plastic. The lock 100 may also be made from Polylactic Acid (PLA) or other suitable materials manufactured from corn. The sleeve 214 may include a polypropylene layer. Accordingly, the polypropylene layer may increase the sleeve 214 rigidity and integrity. For example, the polypropylene layer may prevent a child from ripping, tearing, or chewing through the sleeve 214. In a further embodiment, the tray 200 may include a polypropylene layer. The sleeve 214, the tray 200, and/or the lock 100 may be manufactured such that they are compostable.

While the tab 104 is outside the sleeve 214, the tab 104 may return to a "locked state," but in actuality the tray 200 is "unlocked." For example, when the sleeve 214 is disposed over the tray 200 completely, the lock 100 is in the locked position. In such an example, actuation of the lock 100 via pressure may cause the lock 100 to convert to the unlocked position. Further, retraction of the sleeve 212 may maintain the lock 100 in the unlocked position, as the sleeve 214 may maintain adequate pressure upon the lock 100 as the sleeve 214 is being removed. However, once the sleeve 212 has 214 the tab 104, the lock 100 may return to the locked state, yet the sleeve 214 and the tray 200 are separate.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A pressure sensitive locking mechanism comprising:
a flex portion comprising a first flex segment, a first flex bend, a second flex segment, a second flex bend, a third flex segment, a third flex bend, a fourth flex segment, a fourth flex bend, and a fifth flex segment,
wherein the first flex segment, the third flex segment, and the fifth flex segment are parallel,
wherein the second flex segment and the fourth flex segment are parallel, and
wherein the first flex segment, the first flex bend, the second flex segment, the second flex bend, the third flex segment, and the third flex bend form an elbow;
an anchor portion comprising a first anchor bend, a first anchor segment, a second anchor bend, a second anchor segment, and an anchor end,
wherein the first anchor segment is orthogonal to the second anchor segment;
a guard disposed orthogonally to the first flex segment;
a tab disposed on the guard, the tab further disposed orthogonal to the guard; and
the pressure sensitive locking mechanism configurable in a locked state and an unlocked state,
wherein the tab and the elbow are configured to receive a pressure via the tab,
wherein application of the pressure is configured to convert the pressure sensitive locking mechanism from the locked state to the unlocked state, and
wherein withdrawal of the pressure is configured to convert the pressure sensitive locking mechanism from the unlocked state to the locked state; and
a first rim extending from the guard to the anchor end;
a second rim extending from the guard to the anchor end;
a central plane disposed between the first rim and the second rim;
a top duct bound by at least the first rim, the central plane, and the second rim; and
a bottom duct bound by at least the first rim, the central plane, and the second rim,
wherein the top duct is antipodal to the bottom duct.

2. The pressure sensitive locking mechanism of claim 1, the tab further comprising:
a first tab edge and a second tab edge, the first tab edge and the second tab edge orthogonal to the guard;
a tab rim comprising a convex curvature relative to the guard;
a first tab corner conjoining the tab rim and the first tab edge; and
a second tab corner conjoining the tab rim and the second tab edge,
wherein the first tab corner and the second tab corner are rounded.

3. A pressure sensitive locking container comprising:
a pressure sensitive locking mechanism comprising:
a flex portion comprising a first flex segment, a first flex bend, a second flex segment, a second flex bend, a third flex segment, a third flex bend, a fourth flex segment, a fourth flex bend, and a fifth flex segment,
wherein the first flex segment, the third flex segment, and the fifth flex segment are parallel,
wherein the second flex segment and the fourth flex segment, and
wherein the first flex segment, the first flex bend, the second flex segment, the second flex bend, the third flex segment, and the third flex bend form an elbow;
an anchor portion comprising a first anchor bend, a first anchor segment, a second anchor bend, a second anchor segment, and an anchor end,
wherein the first anchor segment is orthogonal to the second anchor segment;
a guard disposed orthogonally to the first flex segment;
a tab disposed on the guard, the tab further disposed orthogonal to the guard; and
the pressure sensitive locking mechanism configurable in a locked state and an unlocked state,
wherein the tab and the elbow are configured to receive a pressure via the tab,
wherein application of the pressure is configured to convert the pressure sensitive locking mechanism from the locked state to the unlocked state, and
wherein withdrawal of the pressure is configured to convert the pressure sensitive locking mechanism from the unlocked state to the locked state;
a tray comprising a bottom surface, a floor, a spacer, a first sidewall, a second sidewall, a front wall, a rear wall, a lock channel and an aperture,
wherein the bottom surface traverses the first sidewall, the second sidewall, the front wall, and the rear wall,
wherein the spacer is disposed atop the bottom surface and the floor is disposed atop the spacer,
wherein the lock channel is bound by at least the bottom surface, the spacer, and the floor, and the lock channel is sized to accept at least the flex portion and the anchor portion,
wherein the tray is configurable in a sheathed state and an unsheathed state,
wherein the aperture is sized to accept the tab; and
a sleeve sized to accept the tray in the sheathed state, the sleeve comprising a sleeve window,
wherein the sleeve window is sized to accept the tab,
wherein, in the sheathed state, the sleeve window is overlaid the aperture, and
wherein the tray is configured to convert from the sheathed state to the unsheathed state via removal of the sleeve in the unlocked stated.

4. The pressure sensitive locking container of claim 3, the tab further comprising:
a first tab edge and a second tab edge, the first tab edge and the second tab edge orthogonal to the guard;
a tab rim comprising a convex curvature relative to the guard;
a first tab corner conjoining the tab rim and the first tab edge; and
a second tab corner conjoining the tab rim and the second tab edge,
wherein the first tab corner and the second tab corner are rounded.

5. The pressure sensitive locking container of claim 3, further comprising:
a first rim extending from the guard to the anchor end;
a second rim extending from the guard to the anchor end;
a central plane disposed between the first rim and the second rim;
a top duct bound by at least the first rim, the central plane, and the second rim; and a bottom duct bound by at least the first rim, the central plane, and the second rim, wherein the top duct is antipodal to the bottom duct.

6. The pressure sensitive locking container of claim 3, the flex portion comprising a flex width and the anchor portion comprising an anchor width, wherein the anchor width is greater than the flex width.

7. A pressure sensitive locking container comprising:

two pressure sensitive locking mechanisms, each comprising:

a flex portion comprising a first flex segment, a first flex bend, a second flex segment, a second flex bend, a third flex segment, a third flex bend, a fourth flex segment, a fourth flex bend, and a fifth flex segment, wherein the first flex segment, the third flex segment, and the fifth flex segment are parallel, wherein the second flex segment and the fourth flex segment, and wherein the first flex segment, the first flex bend, the second flex segment, the second flex bend, the third flex segment, and the third flex bend form an elbow;

an anchor portion comprising a first anchor bend, a first anchor segment, a second anchor bend, a second anchor segment, and an anchor end, wherein the first anchor segment is orthogonal to the second anchor segment;

a guard disposed orthogonally to the first flex segment;

a tab disposed on the guard, the tab further disposed orthogonal to the guard; and the pressure sensitive locking mechanism configurable in a locked state and an unlocked state, wherein the tab and the elbow are configured to receive a pressure via the tab, wherein application of the pressure is configured to convert the pressure sensitive locking mechanism from the locked state to the unlocked state, and wherein withdrawal of the pressure is configured to convert the pressure sensitive locking mechanism from the unlocked state to the locked state;

a tray comprising a bottom surface, a floor, a spacer, a first sidewall, a second sidewall, a front wall, a rear wall, a lock channel, a first aperture, and a second aperture, wherein the bottom surface traverses the first sidewall, the second sidewall, the front wall, and the rear wall, wherein the spacer is disposed atop the bottom surface and the floor is disposed atop the spacer, wherein the lock channel is bound by at least the bottom surface, the spacer, and the floor, and the lock channel is sized to accept at least the flex portion and the anchor portion, wherein the tray is configurable in a sheathed state and an unsheathed state, and wherein the first aperture and the second aperture are sized to accept the tabs; and a sleeve sized to accept the tray in the sheathed state, the sleeve comprising a first sleeve window and a second sleeve window, wherein the first sleeve window and the second sleeve window are each sized to accept one of the tabs, wherein, in the sheathed state, the first sleeve window is overlaid the first aperture and the second sleeve window is overlaid the second aperture, and wherein the tray is configured to convert from the sheathed state to the unsheathed state via removal of the sleeve in the unlocked stated.

8. The pressure sensitive locking container of claim 7, each tab further comprising:

a first tab edge and a second tab edge, the first tab edge and the second tab edge orthogonal to the guard;

a tab rim comprising a convex curvature relative to the guard;

a first tab corner conjoining the tab rim and the first tab edge; and a second tab corner conjoining the tab rim and the second tab edge, wherein the first tab corner and the second tab corner are rounded.

9. The pressure sensitive locking container of claim 7, further comprising:

a first rim extending from the guard to the anchor end;

a second rim extending from the guard to the anchor end;

a central plane disposed between the first rim and the second rim;

a top duct bound by at least the first rim, the central plane, and the second rim; and a bottom duct bound by at least the first rim, the central plane, and the second rim, wherein the top duct is antipodal to the bottom duct.

10. The pressure sensitive locking container of claim 7, the flex portion comprising a flex width and the anchor portion comprising an anchor width, wherein the anchor width is greater than the flex width.

* * * * *